(12) United States Patent
Pauwels et al.

(10) Patent No.: US 8,162,151 B2
(45) Date of Patent: Apr. 24, 2012

(54) FLOW-THROUGH DEVICE AND CARTRIDGE APPLIED THEREBY

(75) Inventors: Bart Hubert Edith Pauwels, Breendonk (BE); Luc Gerard Ludovicus Maria Van Echelpoel, Beerse (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 660 days.

(21) Appl. No.: 12/278,698

(22) PCT Filed: Jan. 18, 2007

(86) PCT No.: PCT/BE2007/000010
§ 371 (c)(1),
(2), (4) Date: Aug. 7, 2008

(87) PCT Pub. No.: WO2007/090249
PCT Pub. Date: Aug. 16, 2007

(65) Prior Publication Data
US 2009/0038278 A1 Feb. 12, 2009

(30) Foreign Application Priority Data
Feb. 10, 2006 (BE) .................................. 2006/0086

(51) Int. Cl.
*B01D 46/00* (2006.01)
(52) U.S. Cl. .............. 210/437; 55/498; 55/502; 55/503; 210/440; 210/441; 210/443
(58) Field of Classification Search .................... 55/498, 55/502, 503, 504, 510; 210/437, 440, 443, 210/444, 451, 452, 438
See application file for complete search history.

(56) References Cited

U.S. PATENT DOCUMENTS

| 1,750,632 | A | | 3/1930 | Farmer |
| 4,291,548 | A | | 9/1981 | Livesay |
| 4,925,466 | A | | 5/1990 | Overby |
| 5,112,372 | A | * | 5/1992 | Boeckermann et al. ........ 96/388 |
| 6,391,197 | B1 | * | 5/2002 | Billiet ............................ 210/232 |
| 6,409,786 | B1 | * | 6/2002 | Wright et al. .................... 55/507 |
| 6,416,563 | B1 | * | 7/2002 | Wright et al. .................... 55/513 |
| 6,461,397 | B1 | * | 10/2002 | Billiet ............................. 55/498 |
| 6,936,084 | B2 | * | 8/2005 | Schlensker et al. ............. 55/321 |
| 7,344,581 | B2 | * | 3/2008 | Pearson et al. .................. 55/486 |
| 7,344,582 | B2 | * | 3/2008 | Pearson et al. .................. 55/504 |

(Continued)

FOREIGN PATENT DOCUMENTS
WO WO 01/24909 A1 4/2001

*Primary Examiner* — Robert Clemente
(74) *Attorney, Agent, or Firm* — Bacon & Thomas, PLLC

(57) ABSTRACT

Flow-through device for fluids, consisting of: a housing (2) which is built of a head (3) with an inlet channel (5) and an outlet channel (8); and a pot (4) which can be provided on the head (3) and in which is provided a cartridge which consists of an active flow-through element (20) and a cap (21) defining a flow-through channel (22) with an inlet opening (23) and an outlet opening (24), whereby the inlet opening (23) of the flow-through channel (22) is eccentric in relation to the axis (B-B') of the flow-through element (20), whereas the outlet opening (24) is centrally positioned; and whereby the flow-through section of the flow-through channel (22) as of the inlet opening (23) to the outlet opening (24) first decreases and then increases again.

8 Claims, 3 Drawing Sheets

U.S. PATENT DOCUMENTS

| | | | |
|---|---|---|---|
| 7,390,342 B2 * | 6/2008 | Pearson et al. | 55/486 |
| 7,442,220 B2 * | 10/2008 | Pearson et al. | 55/418 |
| 7,550,023 B2 * | 6/2009 | Schuster et al. | 55/498 |
| 7,618,480 B2 * | 11/2009 | Barnwell | 95/273 |
| 2004/0159238 A1 | 8/2004 | Strmen | |
| 2009/0127184 A1 * | 5/2009 | Pauwels et al. | 210/441 |

* cited by examiner

FLOW-THROUGH DEVICE AND CARTRIDGE APPLIED THEREBY

The present invention concerns an improved flow-through device, in particular a flow-through device for fluids which mainly consists of a housing in which is provided an exchangeable cartridge.

In particular, the invention concerns a flow-through device whose housing is built of: a head with a hooked inlet channel with an input and an output and an outlet channel with an input and an output; and a pot which can be provided on the above-mentioned head and in which the above-mentioned exchangeable cartridge has been provided.

The cartridge consists of an active flow-through element, for example a filter element, an absorption, adsorption or catalyst element on the one hand, and of a cap defining a flow-through channel on the other hand, with an inlet opening on the one hand which is connected to the output of the above-mentioned inlet channel of the head when mounted and which is directed mainly crosswise to the axial direction of the flow-through element, and an outlet opening on the other hand which is connected to an inner space of the above-mentioned active flow-through element.

Consequently, the above-mentioned cap makes sure that the fluids are guided via the inlet channel of the head into the inner space of the active flow-through element. Next, the fluids move through the porous wall of the active element and subsequently end up in the pot which is connected to the outlet channel.

Such flow-through devices are already known in the form of filters, whereby the inlet opening of the flow-through channel, as well as its outlet opening, are positioned centrally in the flow-through device.

The problem which arises with such filters is that the incoming fluid flow in the inlet line makes an angle of 90° over a short distance, as a result of which turbulences are caused in this fluid flow, which leads to pressure losses.

The present invention aims to provide a single solution to the above-mentioned and other disadvantages.

To this end, the present invention concerns an improved flow-through device for fluids which mainly consists of: a housing which is built of a head with a hooked inlet channel having an input and an output and an outlet channel with an input and an output; a pot which can be provided on the above-mentioned head and in which has been provided an exchangeable cartridge which consists of a tubular active flow-through element and a cap defining a flow-through channel with an inlet opening on the one hand which is connected to the output of the above-mentioned inlet channel of the head when mounted and which is directed mainly crosswise to the axial direction of the flow-through element, and an outlet opening on the other hand which is connected to an inner space of the above-mentioned active flow-through element, whereby the above-mentioned inlet opening of the flow-through channel of the cap is eccentrically positioned in relation to the axis of the active flow-through element, whereas the outlet opening of this flow-through channel is centrally positioned and whereby the above-mentioned flow-through channel in the cap has a variable flow-through section which, as of the inlet opening towards the outlet opening, first decreases over a length and then increases again up to the outlet opening.

An advantage of such an improved flow-through device according to the invention is that, as the inlet opening of the cap's flow-through channel is eccentrically positioned in relation to the axis of the active flow-through element, whereas its outlet opening is centrally positioned, the fluid flow is guided to the active flow-through element in a better way, as a result of which the turbulences decrease.

An additional advantage of such an improved flow-through device is that, as appears from tests, the initial decrease of the flow-through section, as of the inlet opening to the outlet opening of the flow-through channel, leads to a considerable reduction of the pressure loss.

Studies have demonstrated that this unexpected decrease of the pressure loss, by reducing the flow-through section in the flow-through channel, is due to the fact that the space in the flow-through channel in which turbulences may occur is reduced.

In a preferred embodiment of an improved flow-through device according to the invention, the flow-through channel is curved, whereby on the inside of the curve, the channel is confined by a concave wall, which preferably has an elliptic tendency, and which is confined on the outside by a wall with a concave part and a convex part following on from the latter.

An advantage of such an improved flow-through device is that the concave wall makes sure, on the inside of the bend, that there is a gradual decrease of the flow-through section, as a result of which turbulences and recirculations in the incoming fluid flow are reduced and an almost laminar flow is obtained.

The invention also concerns a cartridge which can be applied in an improved flow-through device, as described above, and which consists of a tubular active flow-through element and a cap defining a flow-through channel with an inlet opening on the one hand which is directed mainly crosswise to the axial direction of the flow-through element, and an outlet opening on the other hand which is connected to an inner space of the above-mentioned active flow-through element, whereby the above-mentioned inlet opening of the flow-through channel of the cap is eccentrically positioned in relation to the axis of the flow-through element, whereas the outlet opening of this flow-through channel is centrally positioned, and whereby the above-mentioned flow-through channel in the cap has a variable flow-through section which, as of the inlet opening to the outlet opening, first decreases over a length and then increases again up to the outlet opening.

In order to better explain the characteristics of the invention, the following preferred embodiment of an improved flow-through device according to the invention is given as an example only without being limitative in any way, with reference to the accompanying drawings, in which.

Figure 1:
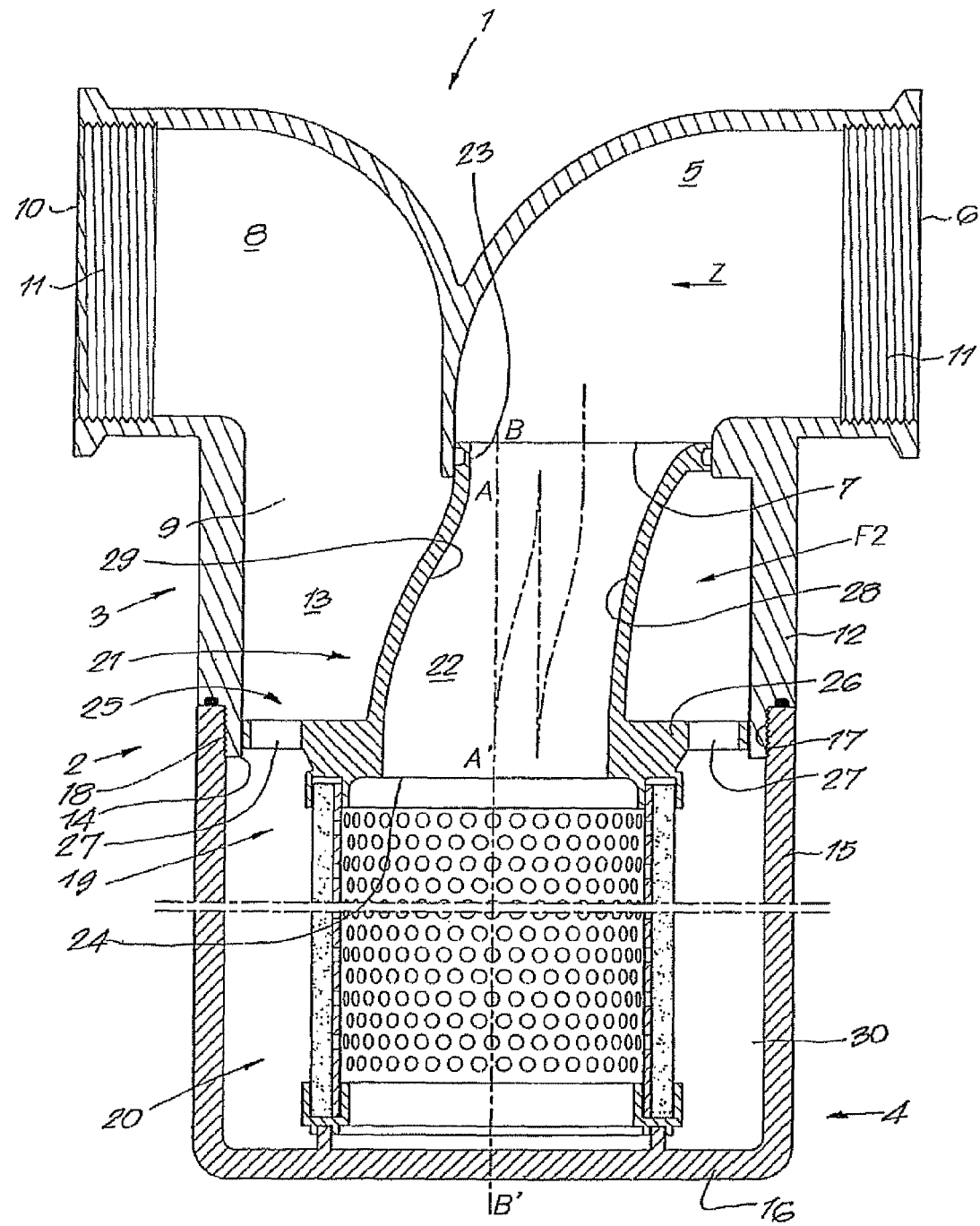
FIG. 1 is a section of an improved flow-through device according to the invention.
Figure 2:
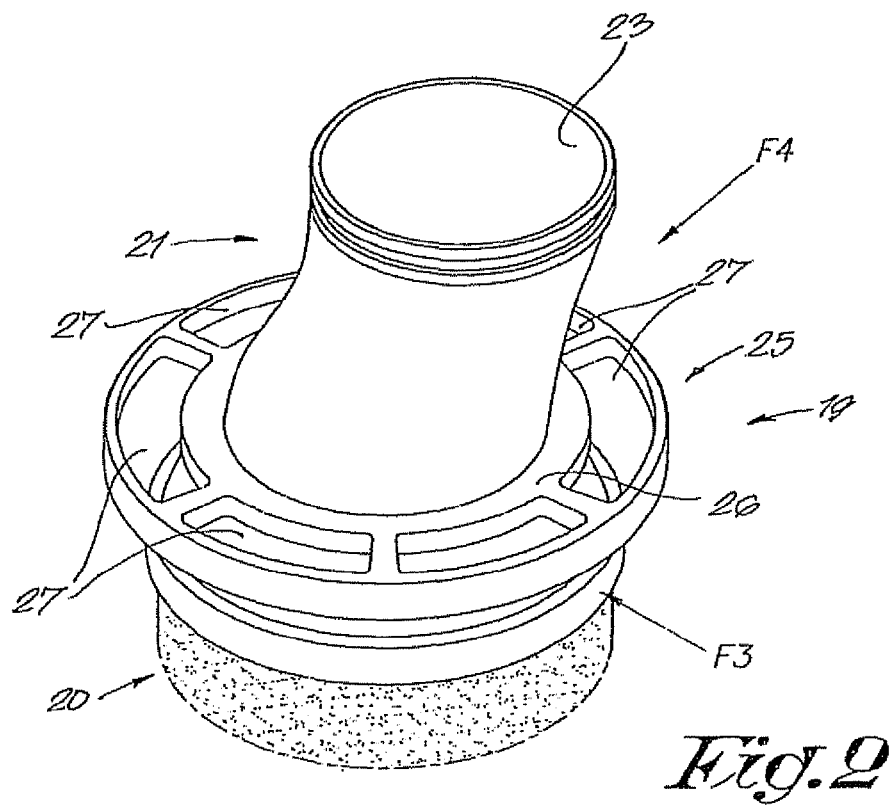
FIG. 2 represents a filter cartridge in perspective, indicated by F2 in FIG. 1.

FIGS. 1 to 5 represent an improved flow-through device 1 for fluids which, in this case but not necessarily, is made in the shape of a filter which mainly consists of a housing 2 which is built of a head 3 and a pot 4.

The head 3 is made as a casting in this case, for example made of aluminium, and it is provided with a hooked inlet channel 5 having an input 6 and an output 7 and an outlet channel 8 with an input 9 and an output 10.

In this embodiment, the input 6 of the inlet channel 5 is aligned with the output 10 of the outlet channel 8, and both this input 6 and the output 10 are provided with an internal screw thread 11.

The output 7 of the inlet channel 5 and the input 9 of the outlet channel 8 are positioned next to each other in the head 3.

Transversal to the main flow direction Z, parallel to the aligned input 6 and output 10, the head 3 is provided with a cylindrical case 12 delimiting an inner space 13 and forming a connecting opening 14 for the pot 4 at its free end.

The outlet channel 8 is connected to the inner space 13 and at its free end it is directed parallel, or mainly parallel, to the axis A-A' of the case 12

The inlet channel 5 is bent, such that a gradual transition is obtained from the main flow direction Z to the direction which is transversal to the latter, according to the above-mentioned axis AA'.

The flow-through section of the inlet channel 5 on the one hand, and the outlet channel 8 on the other hand, is in this case, but not necessarily, equally large or practically equally large.

The pot 4 mainly consists of a tubular body 15 which is sealed by a bottom 16 on one far end, and which, near its free edge, is provided with an internal screw thread 17 which can work in conjunction with an external screw thread 18 near the connecting opening 14 of the head 3.

Inside the pot 4 is provided an exchangeable cartridge 19 which mainly consists of a tubular active flow-through element 20 which is in this case made in the form of a s filter element, and of a cap 21 defining a flow-through channel 22 with an inlet opening 23 on the one hand which is connected to the output 7 of the above-mentioned inlet channel 5 of the head 3 when mounted and which is directed mainly crosswise to the axial direction of the flow-through element 20, and with an outlet opening 24 on the other hand which is connected to an inner space of the above-mentioned active flow-through element 20.

Near the above-mentioned outlet opening 24, the cap 21 is in this case provided with centralizers 25 for centring the active flow-through element 20 in the pot 4, which centralizers are in this case made in the shape of a ring 26 with openings 27, which works in conjunction with the inner wall of the above-mentioned case 12 of the head 3. One must always take into account to provide a sufficient passage, however, so as not to cause any additional pressure drops.

It is clear that the above-mentioned centralizers are not restricted to a ring which is provided round the cap 21, but that they can also be made in many other ways, such as for example in the form of mainly radially directed fins or the like which work in conjunction with the inner wall of the axial case 12.

According to the invention, the above-mentioned inlet opening 23 of the flow-through channel 22 of the cap 21 is eccentrically positioned in relation to the axis B-B' of the flow-through element 20, which axis B-B' in this case coincides with the above-mentioned axis A-A' of the case 12, whereas the outlet opening 24 of this flow-through channel 22 is centrally positioned.

Figure 3:
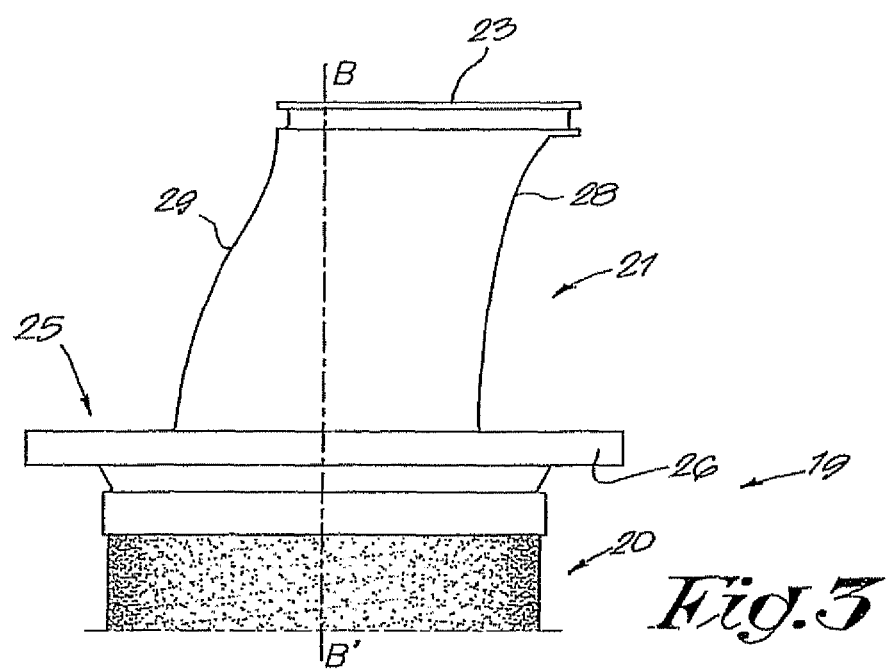
FIG. 3 represents a view according to arrow F3 in FIG. 2.
Figure 4:
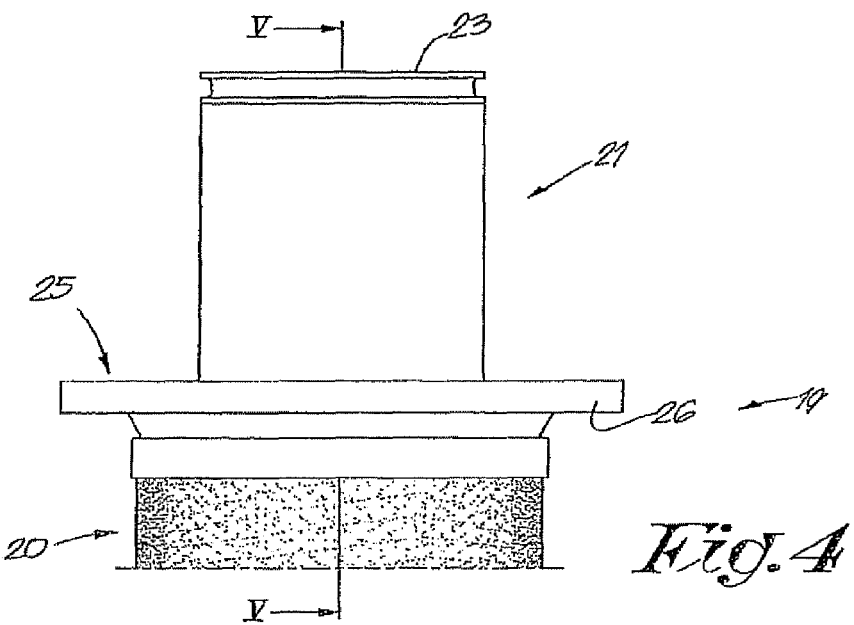
FIG. 4 represents a view according to arrow F4 in FIG. 2.
Figure 5:
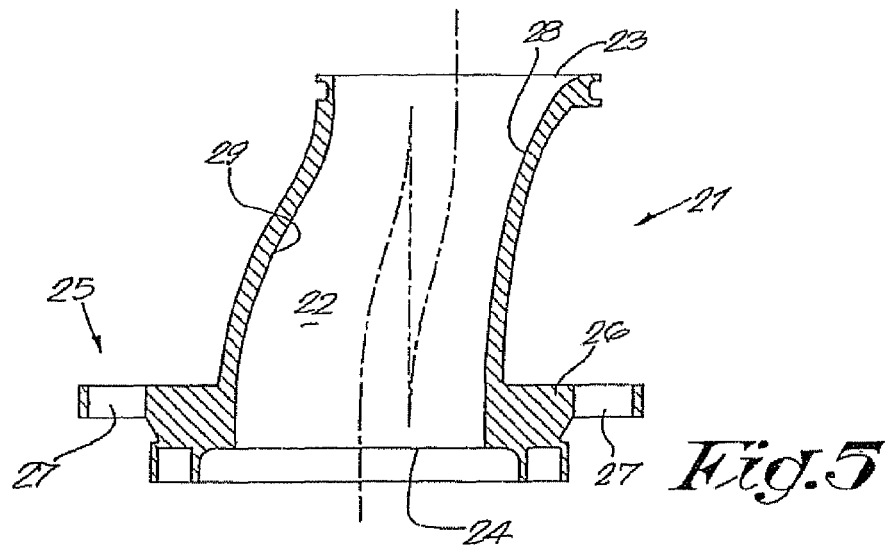
FIG. 5 is a section according to line V-V in FIG. 4.

As is clearly indicated in FIGS. 3 and 5, the flow-through channel 22 has a bend, whereby on the inside of the bend the channel 22 is confined by a concave wall 28 which is elliptic in a preferred embodiment, and on the outside it is confined by a wall 29 with a concave part and a convex part following on from the latter.

Figure 6:
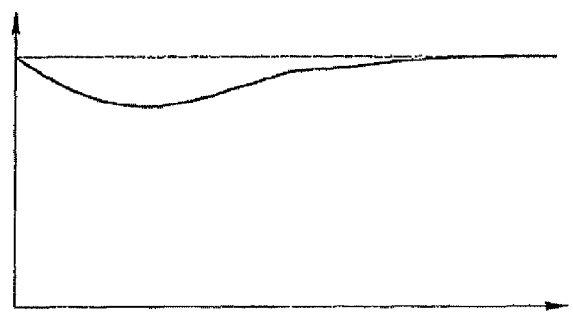
FIG. 6 represents the size of the flow-through section of the flow-through channel, as represented in FIG. 5, as a function of the axial flow-through position.

The above-mentioned flow-through channel 22 in the cap 21 has a variable flow-through section according to the invention which, as is represented in FIG. 6, as of the inlet opening 23 to the outlet opening 24, first decreases over a length and then increases again up to the outlet opening 24.

The vertical axis in FIG. 6 represents the flow-through section of the flow-through channel 22, whereas the horizontal axis represents the length in the flow-through direction of this flow-through channel as of the inlet opening 23 up to the outlet opening 24.

In this case, but in a non-restrictive manner, the size of the flow-through section decreases up to practically 80% of the flow-through section at the inlet opening 23, after which the flow-through section gradually increases again up to the outlet opening 24.

The working of the improved flow-through device 1 according to the invention is simple and as follows.

A gas or liquid to be filtered is supplied for example via the input 6 of the head 3 and is guided via the inlet channel 5 and subsequently through the flow-through channel 22 into the inner space of the active flow-through element 20 in a streamlined manner.

The above-mentioned cap 21 hereby forms a partition between the inlet part of the flow-through device 1 on the one hand, consisting of the inlet channel 5, the flow-through channel 22 and the inner space in the active flow-through element 20, and an outlet part on the other hand which is formed of the space 30 in the pot 4 round the active flow-through element 20; the space in the head 3 round the cap 21; and the outlet channel 8.

Thanks to the pressure difference between the above-mentioned inlet part and the outlet part, the fluid is driven through the porous filter material.

In this manner, the filtered gas or the filtered liquid ends up in the space 30 between the active flow-through element 20 and the pot 4.

This space 30 is connected via openings 27 to the outlet channel 8 of the head 3, where the gas or the liquid is carried to the output 10.

Thanks to the initial decrease of the flow-through section, as of the inlet opening 23 to the outlet opening 24 of the flow-through channel 22, a considerable reduction of the pressure loss is obtained according to the invention which, as appears from elaborate studies, is due to the fact that the space in the flow-through channel 22 in which turbulences may occur is reduced.

Further, as the inlet opening 23 of the flow-through channel 22 of the cap 21 is eccentrically positioned in relation to the axis of the active flow-through element 20, whereas its outlet opening 24 is centrally positioned, this provides a better guiding of the fluid flow to the active flow-through element, as a result of which the turbulences decrease.

Another advantage is that, thanks to the form of the concave wall 28, the flow of the treated fluid in the space in the head 3 round the cap 21 is guided outside in a better way than with the known flow-through devices, such that less pressure losses are built up in this place as well.

It is clear that the active flow-through element 20 in the given example may also be another active element than a filter element, such as for example an air dehumidifier which may contain a desiccant or another absorption or adsorption means.

The active flow-through element may also comprise a catalyst or for example active carbon.

The present invention is by no means restricted to the embodiment given as an example and represented in the accompanying drawings; on the contrary, such an improved flow-through device and a cartridge applied thereby can be made in different shapes and dimensions while still remaining within the scope of the invention.

The invention claimed is:

1. Flow-through device for fluids, comprising a housing having a head having a hooked inlet channel having an input and an output and an outlet channel with an input and an output; and a pot mountable on the head and which contains an exchangeable cartridge, said cartridge comprising a tubular active flow-through element having an axis, and including a space formed in the pot round the active flow-through element, said space being connected to the outlet channel; and a cap defining a flow-through channel with an inlet opening which is connected to the output of the inlet channel of the head when the pot is mounted on the head and which is directed mainly crosswise to the axial direction of the flow-through element, and an outlet opening which is connected to an inner space of the active flow-through element, wherein the inlet opening of the flow-through channel of the cap is eccentrically positioned in relation to the axis of the flow-through element, and further wherein the outlet opening of the flow-through channel is centrally positioned, and the flow-through channel in the cap has a variable flow-through section which, from the inlet opening towards the outlet opening, first decreases over a length and then increases again up to the outlet opening.

2. Flow-through device according to claim 1, wherein the flow-through channel has a bend, configured such that on the inside of the bend, the channel is confined by a concave wall, and on the outside of the bend by a wall having a concave part and a convex part following on from the concave part.

3. Flow-through device according to claim 2, wherein the concave wall has an elliptic characteristic on the inside of the bend.

4. Flow-through device according to claim 1, wherein the cap defines a partition between an inlet part comprising the inlet channel, the flow-through channel and the inner space in the active flow-through element, and an outlet part comprising the space in the pot round the active flow-through element, the space in the head round the cap, and the outlet channel.

5. Flow-through device according to claim 1, wherein the cap includes centralizers arranged to center the active flow-through element in the pot.

6. Flow-through device according to claim 5, wherein the centralizers comprise predominantly radially directed fins cooperating with the inner wall of an axial case which is part of the head.

7. Flow-through device according to claim 5, wherein the centralizers comprise a ring with openings provided in an axial case which is part of the head.

8. Flow-through device according to claim 1, wherein the pot is provided with centralizers to substantially centralize the active flow-through element in the pot.

* * * * *